Aug. 25, 1942.  J. W. FITZLOFF  2,293,895
TURKEY HEN BREEDING BLANKET
Filed March 2, 1942
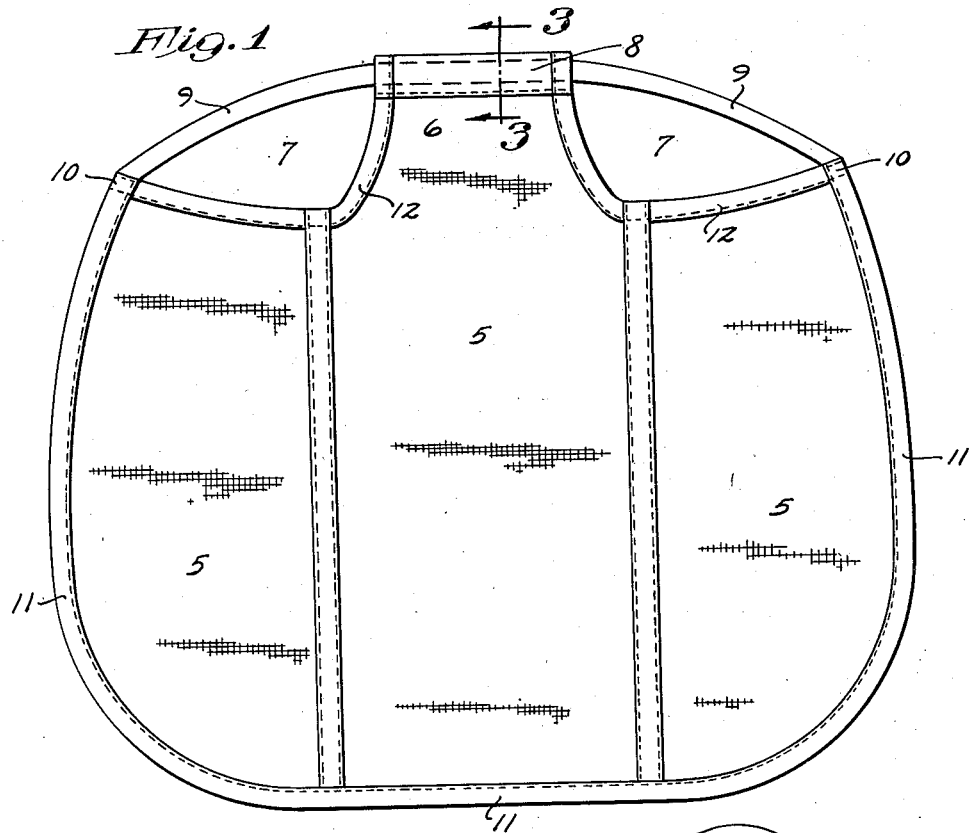
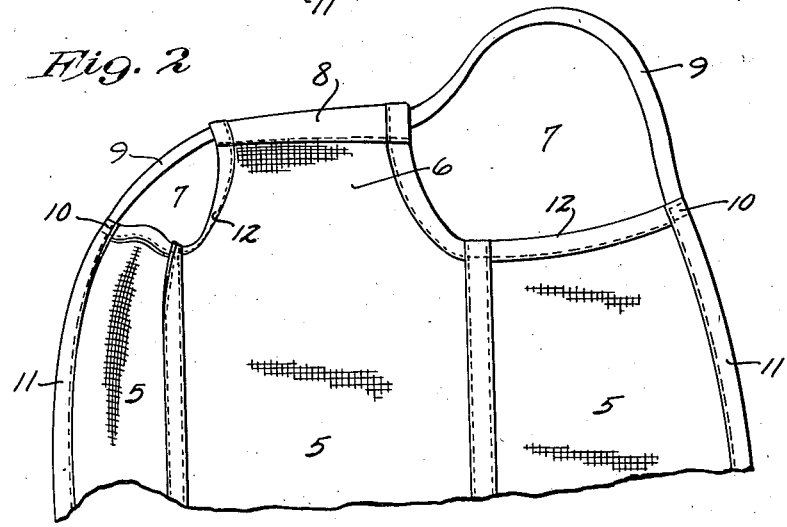
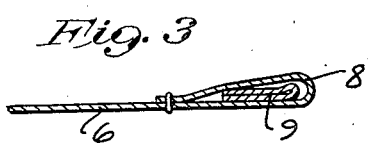
Inventor
John W. Fitzloff
By his Attorneys
Michant & Michant Patented Aug. 25, 1942

2,293,895

UNITED STATES PATENT OFFICE 2,293,895

TURKEY HEN BREEDING BLANKET

John W. Fitzloff, St. Clair, Minn.

Application March 2, 1942, Serial No. 432,931

4 Claims. (Cl. 119—143)

My present invention provides an extremely simple but highly important improvement in what is commercially known as a turkey hen breeding blanket or saddle, and, generally stated, consists of the novel structure and relative arrangement of parts hereinafter described and defined in the claims.

The purpose of such devices is well known. They are usually made of heavy fabric, such as canvas, of a size to well cover the turkey's back and are provided with arm holes through which the wings must be inserted. Hitherto in such blankets the wing holes have had to be very large in order to get the wings through the holes without damaging the wings. After the wings have been inserted through the wing holes, made large enough to pass the wings without damage, the holes are drawn close up to the wing joints where only relatively small holes would be required. These large holes hitherto provided have been so large that when the holes are close to the wing joints there will be a very large amount of play and the old blankets would, therefore, shift on the turkey's back from one side to the other and sometimes drop clear to the side of the turkey.

The above objections to the older form of blanket are entirely eliminated in accordance with my invention by providing a slip tape or cord which forms the outer portion of the wing holes and is slidable endwise, as will presently appear in the description of the drawing.

In the accompanying drawing, which illustrates the invention, like characters indicate like parts throughout the several views.

Referring to the drawing:

Fig. 1 is a plan view of my improved blanket showing the same flattened out and with both wing holes of the same size;

Fig. 2 is a plan view showing the slip tape pulled through a sleeve in the blanket so as to produce an abnormally large hole at the one side and to contract the hole at the opposite side; and Fig. 3 is an enlarged section taken on the line 3—3 of Fig. 1.

The blanket is indicated as an entirety by the numeral 5 and is formed with an upper central portion 6 and on opposite sides of said portions 6 are cut away or notched to form the lower or inner outline of wing holes 7. The upper edge portion 6 is folded upon itself to form a flattened sleeve 8. Extended through and slidable in the sleeve 8 is a slip band or cord 9, the extended ends of which are attached to the blanket 5 at the outer extremities of the notches 7, as indicated at 10. To the edges of the blanket 5 is applied a fabric binding band or strip 11 that is provided with extended binding strips 12 that reinforce the lower wing holes 7 and are preferably carried around and secured to the sleeve 8 to reinforce the latter.

Fig. 2 illustrates the manner in which the blanket is manipulated in applying the same to the turkey hen. For the insertion of the first wing through a wing hole, the slip band or cord 9 is drawn through the sleeve 8, as shown at the right in Fig. 2, thereby producing at the right hand side an abnormally large wing hole through which the first wing of the turkey may be freely inserted. Then, for insertion of the left side wing, the binding cord is pulled toward the left as far as it will go, thereby producing the abnormally large hole at the left with a free insertion of the turkey wing. When the blanket is thus applied, the slip cord is pulled back to a normal position, thereby producing relatively small wing holes at both sides. These relatively small wing holes quite closely engage the wings at or near the shoulder joints and thereby produce minimum sized wing holes at both sides. By this way the blanket, when applied and finally adjusted, will so closely fit the wings that the blanket will be held centered on the back of the turkey and against lateral slipping movements.

In actual practice the desirability and efficiency of this improved device has been thoroughly demonstrated. It makes the application of the blanket a relatively easy matter and provides a better anchorage for the blanket when it is applied. By joining the ends of the slip band or cord 9 to the edge reinforcing binding strips 11, the strain of holding the blanket in place is distributed from said bands 9 to and through the reinforcing strips 11.

What I claim is:

1. A breeding blanket of the kind described made of flexible material formed with wing hole notches and with a centrally projected sleeve, and a slip band slidable through said sleeve with its ends attached to the sides of the blanket at the outer extremities of the wing hole forming notches.

2. A breeding blanket of the kind described made of flexible material formed with wing hole notches and between said notches with a centrally projected portion bent upon itself and stitched to form a flat sleeve, and a flexible band slidable through said sleeve with its ends attached to the sides of said blanket at the outer extremities of said wing hole forming notches.

3. The structure defined in claim 2 in which said wing hole forming notches are reinforced by flexible binding and the edges of said blanket are reinforced by a binding tape that is joined to the binding tape of said notches.

4. The structure defined in claim 2 in which the edges of said blanket are reinforced by a binding tape that joins the ends of said slip band.

JOHN W. FITZLOFF.